(12) United States Patent
Jaensch et al.

(10) Patent No.: US 10,929,522 B2
(45) Date of Patent: Feb. 23, 2021

(54) ENHANCED LEVEL OF AUTHENTICATION RELATED TO A SOFTWARE CLIENT APPLICATION WITHIN A CLIENT COMPUTING DEVICE

(71) Applicant: Deutsche Telekom AG, Bonn (DE)

(72) Inventors: Ruediger Jaensch, Bonn (DE); Michael Dupre, St. Augustin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 136 days.

(21) Appl. No.: 15/659,647

(22) Filed: Jul. 26, 2017

(65) Prior Publication Data
US 2018/0032715 A1 Feb. 1, 2018

(30) Foreign Application Priority Data

Jul. 28, 2016 (EP) .................................... 16181777

(51) Int. Cl.
*H04L 29/08* (2006.01)
*G06F 21/40* (2013.01)
(Continued)

(52) U.S. Cl.
CPC .......... *G06F 21/40* (2013.01); *H04L 63/0853* (2013.01); *H04L 63/0884* (2013.01);
(Continued)

(58) Field of Classification Search
CPC ......... G06F 21/40; G06F 21/42; H04L 67/34; H04W 4/60
See application file for complete search history.

(56) References Cited

U.S. PATENT DOCUMENTS

2006/0080525 A1* 4/2006 Ritter ..................... G06F 21/32
713/155
2010/0093396 A1* 4/2010 Roundtree ........ H04M 1/72522
455/558
(Continued)

FOREIGN PATENT DOCUMENTS

WO    WO 2006010371 A2    2/2006

OTHER PUBLICATIONS

Etsi: "Smart Cards; UICC Application Programming Interface (UICC API) for Java Card (TM) (Release 13)", Nov. 1, 2015 (Nov. 1, 2015), XP055336608, pp. 11-19.

*Primary Examiner* — Ellen Tran
(74) *Attorney, Agent, or Firm* — Leydig, Voit & Mayer, Ltd.

(57) ABSTRACT

A method for authentication related to a software client application within a client computing device includes: in a first step, an authentication-related command and/or module is invoked by the software client application, and a first group of application protocol data units is exchanged between the client computing device and a subscriber identity module entity; in a second step, a subscriber identity module applet is triggered—via the first group of application protocol data units—to contact a subscriber identity module toolkit and/or to trigger an event, so as to invoke a command of the subscriber identity module toolkit; and in a third step, a second group of application protocol data units are exchanged between the client computing device and the subscriber identity module entity, wherein the subscriber identity module toolkit thereby triggers the client computing device to request a user action from the user of the client computing device.

7 Claims, 1 Drawing Sheet

(51) Int. Cl.
*H04W 4/60* (2018.01)
*H04L 29/06* (2006.01)
*H04W 12/00* (2021.01)
*H04W 12/06* (2021.01)
*G06F 21/42* (2013.01)

(52) U.S. Cl.
CPC ............ *H04L 63/102* (2013.01); *H04W 4/60* (2018.02); *H04W 12/0027* (2019.01); *G06F 21/42* (2013.01); *H04L 67/34* (2013.01); *H04W 12/00514* (2019.01); *H04W 12/06* (2013.01)

(56) References Cited

U.S. PATENT DOCUMENTS

| | | | | |
|---|---|---|---|---|
| 2013/0079051 A1* | 3/2013 | Aidee | ................... | H04W 88/02 |
| | | | | 455/550.1 |
| 2013/0260739 A1* | 10/2013 | Saino | ...................... | G06F 9/547 |
| | | | | 455/419 |
| 2014/0073375 A1* | 3/2014 | Li | ......................... | H04W 8/183 |
| | | | | 455/558 |
| 2014/0165170 A1* | 6/2014 | Dmitriev | ................. | H04L 63/08 |
| | | | | 726/7 |

\* cited by examiner

ENHANCED LEVEL OF AUTHENTICATION RELATED TO A SOFTWARE CLIENT APPLICATION WITHIN A CLIENT COMPUTING DEVICE

CROSS-REFERENCE TO RELATED APPLICATIONS

Priority is claimed to European Patent Application No. EP 16 181 777.0, filed on Jul. 28, 2016, the entire disclosure of which is hereby incorporated by reference herein.

FIELD

The present invention relates to a method for an enhanced level of authentication related to a software client application within a client computing device, wherein the client computing device comprises a subscriber identity module entity comprising a subscriber identity module toolkit as well as a subscriber identity module applet, wherein the subscriber identity module toolkit comprises a number of commands to be executed by the client computing device.

The present invention further relates to a system for an enhanced level of authentication related to a software client application within a client computing device, wherein the system comprises the client computing device and a subscriber identity module entity within the client computing device, wherein the client computing device comprises the subscriber identity module entity comprising a subscriber identity module toolkit as well as a subscriber identity module applet, wherein the subscriber identity module toolkit comprises a number of commands to be executed by the client computing device.

The present invention additionally relates to a client computing device for an enhanced level of authentication related to a software client application within the client computing device, wherein the client computing device comprises the subscriber identity module entity comprising a subscriber identity module toolkit as well as a subscriber identity module applet, wherein the subscriber identity module toolkit comprises a number of commands to be executed by the client computing device.

Additionally, the present invention also relates to a subscriber identity module entity for an enhanced level of authentication related to a software client application within a client computing device, wherein subscriber identity module entity is part of or associated with or assigned to the client computing device, wherein the subscriber identity module entity comprising a subscriber identity module toolkit as well as a subscriber identity module applet, wherein the subscriber identity module toolkit comprises a number of commands to be executed by the client computing device.

Furthermore, the present invention relates to a program and to a computer program product for an enhanced level of authentication related to a software client application within a client computing device, wherein the client computing device comprises a subscriber identity module entity comprising a subscriber identity module toolkit as well as a subscriber identity module applet.

BACKGROUND

The uses and capabilities of mobile communication devices have rapidly increased in recent years. For example, mobile communication device users now have the possibility to install or load a multitude of different software applications (or software client applications) on the mobile communication devices, e.g. in order to perform specific tasks such as related to education, entertainment, or financial services or transactions. While the use of such mobile software applications (or software client applications) might provide considerable advantages, such software applications may also present security concerns. Sensitive information, such as a consumer's personal information, passwords, (bank) account information, etc., can be prone to interception or theft by malicious software code. Additionally, if the mobile communication device is lost or stolen, such information can be used by an unauthorized user.

SUMMARY

In an exemplary embodiment, the present invention provides a method for authentication related to a software client application within a client computing device. The client computing device comprises a subscriber identity module entity comprising a subscriber identity module toolkit and a subscriber identity module applet. The subscriber identity module toolkit comprises commands to be executed by the client computing device. The software client application comprises an authentication-related command and/or module requiring a user action from a user of the client computing device. The method comprises the following steps: in a first step, the authentication-related command and/or module is invoked by the software client application, and a first group of application protocol data units is exchanged between the client computing device and the subscriber identity module entity; in a second step, subsequent to the first step, the subscriber identity module applet is triggered—via the first group of application protocol data units—to contact the subscriber identity module toolkit and/or to trigger an event, so as to invoke a command of the subscriber identity module toolkit; and in a third step, subsequent to the second step, a second group of application protocol data units are exchanged between the client computing device and the subscriber identity module entity, wherein the subscriber identity module toolkit thereby triggers the client computing device to request the user action from the user of the client computing device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
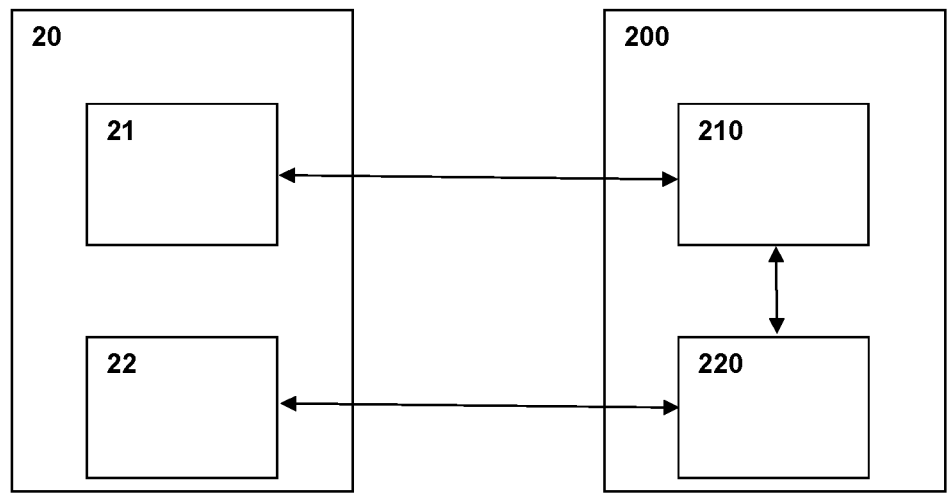
FIG. 1 schematically illustrates a client computing device and a subscriber identity module entity associated with the client computing device.

Exemplary embodiments of the present invention provide a technically simple, effective and especially cost effective solution for realizing an enhanced level of authentication regarding software client applications within a client computing device. Further exemplary embodiments of the present invention provide a system, a client computing device, and a subscriber identity module entity, which system, client computing device, and subscriber identity module entity allows for a cost effective and comparably simple solution for realizing an enhanced level of authentication regarding software client applications within a client computing device.

In an exemplary embodiment, the present invention provides a method for an enhanced level of authentication related to a software client application within a client computing device, wherein the client computing device comprises a subscriber identity module entity comprising a subscriber identity module toolkit as well as a subscriber identity module applet, wherein the subscriber identity module toolkit comprises a number of commands to be executed by the client computing device, wherein the software client application comprises an authentication-related command and/or module requiring a user action from a user of the client computing device, wherein the method comprises the following steps:

in a first step, the authentication-related command and/or module is invoked by the software client application, and a first group of application protocol data units exchanged between the client computing device and the subscriber identity module entity, in a second step, subsequent to the first step, the subscriber identity module applet is triggered—via the first group of application protocol data units—to contact the subscriber identity module toolkit and/or to trigger an event and thereby invoke a command of the subscriber identity module toolkit, in a third step, subsequent to the second step, a second group of application protocol data units are exchanged between the client computing device and the subscriber identity module entity, wherein the subscriber identity module toolkit thereby triggers the client computing device to request the user action from the user of the client computing device.

According to the present invention, it is advantageously possible to enhance the level of authentication related to software client applications within a client computing device via providing the software client application in such a manner that it triggers the request of a user action from a user of the client computing device, interacting with the subscriber identity module entity within the client computing device.

Typically, the client computing device comprises a subscriber identity module entity comprising a subscriber identity module toolkit as well as a subscriber identity module applet, wherein the subscriber identity module toolkit comprises a number of commands to be executed by the client computing device.

According to the present invention, the software client application comprises an authentication-related command and/or module requiring a user action from a user of the client computing device. This is done, according to the present invention, via a first, second, and third step.

During the first step, the authentication-related command and/or module is invoked by the software client application, and a first group of application protocol data units exchanged between the client computing device and the subscriber identity module entity.

During the second step, subsequent to the first step, the subscriber identity module applet is triggered—via the first group of application protocol data units—to contact the subscriber identity module toolkit and/or to trigger an event and thereby invoke a command of the subscriber identity module toolkit.

During the third step, subsequent to the second step, a second group of application protocol data units are exchanged between the client computing device and the subscriber identity module entity, wherein the subscriber identity module toolkit thereby triggers the client computing device to request the user action from the user of the client computing device.

According to the present invention, it is preferred that, during the third step, a subscriber identity module toolkit implementation within the operation system of the client computing device is triggered—via exchanging the second group of application protocol data units and in order to request a user action from the user of the client computing device—to display a message on a display entity of the client computing device and/or to actuate an actuator of the client computing device, especially a haptic actuator or vibration actuator and/or to actuate an acoustic actuator of the client computing device, especially a loudspeaker.

Thereby, it is advantageously possible according to the present invention that a user of the client computing device is informed about a user action to be performed. This information might, e.g., include displaying a message on a display entity of the client computing device and/or of actuating an actuator of the client computing device, especially a haptic actuator or vibration actuator, and/or of actuating an acoustic actuator of the client computing device, especially a loudspeaker. The user action might, e.g., include pushing a button and/or a soft button and/or activating a fingerprint device on the client computing device and/or inputting a code such as a PIN (personal identification number) code or another password (as a reaction of being informed that a user action is to be performed).

According to the present invention, it is furthermore preferred that, during the second step, the subscriber identity module toolkit is contacted and/or triggered, especially by the subscriber identity module applet, via using a file update event, wherein especially a detection file on the subscriber identity module entity, having previously been generated, is modified, wherein such modification of the detection file triggers a file update event of the subscriber identity module toolkit to perform the third step and the exchange of the second group of application protocol data units between the client computing device and the subscriber identity module entity.

Thereby, it is advantageously possible according to the present invention that the subscriber identity module toolkit can be contacted by the subscriber identity module applet.

Furthermore, it is preferred according to the present invention that via a third group of application protocol data units, the authentication-related command and/or module of the software client application requests a specific information, wherein the third group of application protocol data units is exchanged only after a successful execution of the third step.

Thereby, it is advantageously possible according to the present invention that a comparatively high level of authentication can be achieved via exemplary embodiments of the inventive method.

According to a further embodiment of the present invention, it is preferred that the specific information corresponds to a secret information, especially a password information, stored within the subscriber identity module entity, wherein the secret information is transmitted to the software client application only after the user action has been performed by the user of the client computing device, as requested by the authentication-related command and/or module of the software client application.

Thereby, it is advantageously possible according to the present invention that the secret information, stored within the subscriber identity module entity, is protected in a comparatively strong manner from unauthorized access by a software client application of the client computing device.

Furthermore, the present invention relates to a system for an enhanced level of authentication related to a software client application within a client computing device, wherein the system comprises the client computing device and a subscriber identity module entity within the client computing device, wherein the client computing device comprises the subscriber identity module entity comprising a subscriber identity module toolkit as well as a subscriber identity module applet, wherein the subscriber identity module toolkit comprises a number of commands to be executed by the client computing device, wherein the software client application comprises an authentication-related command and/or module requiring a user action from a user of the client computing device, wherein the system is configured such that:
- the authentication-related command and/or module is invoked by the software client application, and a first group of application protocol data units exchanged between the client computing device and the subscriber identity module entity,
- the subscriber identity module applet is triggered—via the first group of application protocol data units—to contact the subscriber identity module toolkit and/or to trigger an event and thereby invoke a command of the subscriber identity module toolkit,
- a second group of application protocol data units are exchanged between the client computing device and the subscriber identity module entity, wherein the subscriber identity module toolkit thereby triggers the client computing device to request the user action from the user of the client computing device.

Thereby, it is advantageously possible according to the present invention—especially with respect to exemplary embodiments of the inventive system—to enhance the level of authentication related to software client applications within a client computing device.

According to the present invention, it is preferred—especially with respect to exemplary embodiments of the inventive system—that the system is configured such that a subscriber identity module toolkit implementation within the operation system of the client computing device is triggered—via exchanging the second group of application protocol data units and in order to request a user action from the user of the client computing device—to
- display a message on a display entity of the client computing device and/or to
- actuate an actuator of the client computing device, especially a haptic actuator or vibration actuator and/or to
- actuate an acoustic actuator of the client computing device, especially a loudspeaker.

According to the present invention, it is furthermore preferred—especially with respect to exemplary embodiments of the inventive system—that the subscriber identity module toolkit is contacted and/or triggered, especially by the subscriber identity module applet, via using a file update event, wherein especially a detection file, having previously been generated, on the subscriber identity module entity is modified, wherein such modification of the detection file triggers a file update event of the subscriber identity module toolkit to exchange the second group of application protocol data units between the client computing device and the subscriber identity module entity.

All preferred embodiments as mentioned above with regard to exemplary embodiments of the inventive method are also—mutatis mutandis—to be applied to exemplary embodiments of the system.

Additionally, the present invention relates to a client computing device for an enhanced level of authentication related to a software client application within the client computing device, wherein the client computing device comprises the subscriber identity module entity comprising a subscriber identity module toolkit as well as a subscriber identity module applet, wherein the subscriber identity module toolkit comprises a number of commands to be executed by the client computing device, wherein the software client application comprises an authentication-related command and/or module requiring a user action from a user of the client computing device, wherein the client computing device is configured such that:
- the authentication-related command and/or module is invoked by the software client application, and a first group of application protocol data units exchanged between the client computing device and the subscriber identity module entity,
- the subscriber identity module applet is triggered—via the first group of application protocol data units—to contact the subscriber identity module toolkit and/or to trigger an event and thereby invoke a command of the subscriber identity module toolkit,
- a second group of application protocol data units are exchanged between the client computing device and the subscriber identity module entity, wherein the subscriber identity module toolkit thereby triggers the client computing device to request the user action from the user of the client computing device.

Thereby, it is advantageously possible according to the present invention—especially with respect to the client computing device—to enhance the level of authentication related to software client applications within a client computing device.

Furthermore, the present invention relates to a subscriber identity module entity for an enhanced level of authentication related to a software client application within a client computing device, wherein the subscriber identity module entity is part of or associated with or assigned to the client computing device, wherein the subscriber identity module entity comprising a subscriber identity module toolkit as well as a subscriber identity module applet, wherein the subscriber identity module toolkit comprises a number of commands to be executed by the client computing device, wherein the subscriber identity module entity is configured such that:
- a first group of application protocol data units are exchanged between the client computing device and the subscriber identity module entity in view of an authentication-related command and/or module of the software client application requiring a user action from a user of the client computing device, and,
- the subscriber identity module applet is triggered—via the first group of application protocol data units—to contact the subscriber identity module toolkit and/or to trigger an event and thereby invoke a command of the subscriber identity module toolkit, a second group of application protocol data units are exchanged between the client computing device and the subscriber identity module entity, wherein the subscriber identity module toolkit thereby triggers the client computing device to request the user action from the user of the client computing device.

Thereby, it is advantageously possible according to the present invention—especially with respect to the subscriber identity module entity—to enhance the level of authentication related to software client applications within a client computing device.

All preferred embodiments as mentioned above with regard to exemplary embodiments of the inventive method are also—mutatis mutandis—to be applied to exemplary embodiments of the inventive client computing device, and exemplary embodiments of the inventive subscriber identity module entity.

Additionally, the present invention relates to a program comprising a computer readable program code which, when executed on a computer or on a client computing device, especially as part of a software client application, or on a subscriber identity module entity, especially as part of a subscriber identity module applet and/or of a subscriber identity module toolkit, or in part on a client computing device and in part on a subscriber identity module entity, causes the computer or the client computing device and/or the subscriber identity module entity to perform exemplary embodiments of the inventive method.

Still additionally, the present invention relates to computer program product for an enhanced level of authentication related to a software client application within a client computing device, wherein the client computing device comprises a subscriber identity module entity comprising a subscriber identity module toolkit as well as a subscriber identity module applet, the computer program product comprising a computer program stored on a storage medium, the computer program comprising program code which, when executed on a computer or on a client computing device, especially as part of a software client application, or on a subscriber identity module entity, especially as part of a subscriber identity module applet and/or of a subscriber identity module toolkit, or in part on a client computing device and in part on a subscriber identity module entity, causes the computer or the client computing device and/or the subscriber identity module entity to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a communication device or client computing device 20, having a subscriber identity module entity 200, is schematically shown. The subscriber identity module entity 200 comprises a subscriber identity module toolkit 210 as well as a subscriber identity module applet 220, and the client computing device 20 comprises a software client application 22 and a subscriber identity module toolkit implementation 21 within the operating system of the client computing device 20.

The subscriber identity module toolkit 210—being part of the subscriber identity module entity 200, and being typically realized via an (subscriber identity module) operating system installed or located within the subscriber identity module entity 200—comprises a number of commands, especially commands to be executed by the client computing device 20.

According to the present invention, the software client application 22 comprises an authentication-related command and/or module requiring a user action from a user of the client computing device 20. Via this authentication-related command and/or module, it is advantageously possible to require a user interaction with the client computing device 20 (in order for a specific process step or command to be executed), hence the level of authentication is enhanced due to the user equipment providing this requested user input or this requested user action.

Conventionally known software client applications are able to easily communicate with the user of a client computing device 20, especially using a graphical user interface (GUI) or other ways of interaction with the user such as using audible input and/or haptic input. However, there are also software client applications comprising malware, and in connection with the typical memory (or the typical organization of the memory) used within client computing devices, leads to the reputation that conventionally known software client applications are rather unfit for security critical applications or use cases.

Even though a higher level of security and/or of authentication could be obtained by using subscriber identity module applets, it is generally assumed that in case of a communication of a software client application on the one hand, with a subscriber identity module applet on the other hand, no operation (or command) of the subscriber identity module toolkit (i.e. no action of a subscriber identity module toolkit) is able to be triggered. Hence, it is assumed that the subscriber identity module applet is not able per se to trigger a subscriber identity module toolkit action (e.g. in order to display a text on a display device of the client computing device, using the subscriber identity module toolkit).

Figure 2:
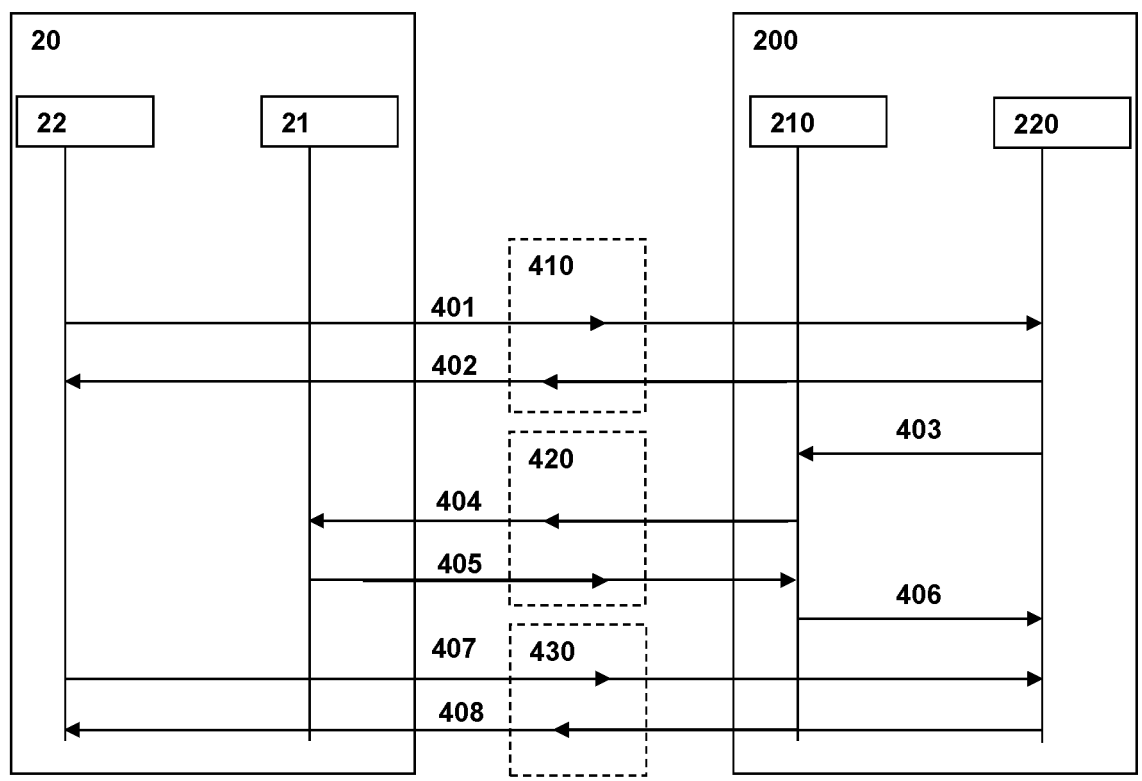
FIG. 2 schematically illustrates a communication diagram between the client computing device on the one hand, and a subscriber identity module entity on the other hand.

This is where, according to the present invention, a solution is provided in order to enhance the level of authentication. This is realized via the software client application 22 being coupled to the subscriber identity module toolkit 210, and represented in FIG. 2. FIG. 2 schematically illustrates a communication diagram between the client computing device 20 (comprising the software client application 22 and the subscriber identity module toolkit implementation 21 within the operating system of the client computing device 20) on the one hand, and a subscriber identity module entity 200 (comprising the subscriber identity module applet 220 and the subscriber identity module toolkit 210) on the other hand. The software client application 22 is coupled to the subscriber identity module toolkit 210 via using, in a first step, a first group of application protocol data units 410 exchanged between the client computing device 20 and the subscriber identity module entity 200, the first group of application protocol data units being triggered by an authentication-related command and/or module of the software client application 22. The first group of application protocol data units 410 involve at least a first processing step 401 (e.g., involving at least one message sent from the software client application 22 to the subscriber identity module applet 220) and a second processing step 402 (e.g., involving at least one message sent from the subscriber identity module applet 220 to the software client application 22). In a second step, subsequent to the first step, the subscriber identity module applet 220 is triggered—via the first group of application protocol data units 410—to contact the subscriber identity module toolkit 210 and/or to trigger an event and thereby invoke a command of the subscriber identity module toolkit 210, which involves a third processing step 403. In a third step, subsequent to the second step, a second group of application protocol data units 420 are exchanged between the client computing device 20 and the subscriber identity module entity 200, wherein the subscriber identity module toolkit 210 thereby triggers the client computing device 20 to request the user action from the user of the client computing device 20. The second group of application protocol data units 420 involve at least a fourth processing step 404 (e.g., involving at least one message sent from the subscriber identity module toolkit 210 to the subscriber identity module toolkit implementation 21) and a fifth processing step 405 (e.g., involving at least one message sent from the subscriber identity module toolkit implementation 21 to the subscriber identity module toolkit 210).

In the exemplary embodiment shown in FIG. 2, the result of the user action is transmitted to the subscriber identity module applet 220 in a sixth processing step 406. Furthermore, the exemplary embodiment shown in FIG. 2 also comprises a third group of application protocol data units 430, involving at least a seventh processing step 407 (e.g., involving at least one message sent from the software client application 22 to the subscriber identity module applet 220) and an eighth processing step 408 (e.g., involving at least one message sent from the subscriber identity module applet 220 to the software client application 22).

Hence, according to the present invention, it is assumed that subscriber identity module applets 220 can be accessed by software client applications 22 on the client computing device 20, e.g. according to the SimAlliance Open Mobile API specifications. This mechanism could be secured by an access policy that is not transparent to the user of the client computing device 20.

Typically, the subscriber identity module entity 200 is able to communicate with the user of the client computing device 20 (such as via displaying simple text or requesting an acknowledgement for a specific action), especially using the SIM-Toolkit Framework (ETSI TS 102.223). However, the communication of the software client application 22 with the subscriber identity module applet 220 (using application protocol data units (or APDUs), ETSI TS 102.221) conventionally does not provide a direct access towards the subscriber identity module toolkit 210 (ETSI TS 102.241).

According to exemplary embodiments of the present invention, that limitation is overcome by connecting or coupling the software client application 22 with the subscriber identity module toolkit 210 via the third processing step 403 being executed, i.e. after a first group of application protocol data units 410 are exchanged between the client computing device 20 and the subscriber identity module entity 200, the subscriber identity module applet 220 (triggered via the first group of application protocol data units 410) contacts the subscriber identity module toolkit 210 and/or triggers an event and thereby invokes a command of the subscriber identity module toolkit 210.

This contacting of the subscriber identity module toolkit 210 (or this triggering an event and thereby invoking a command of the subscriber identity module toolkit 210) is able to be realized, according to an embodiment of the present invention, via triggering a subscriber identity module toolkit action via a "File update event": The subscriber identity module toolkit 210 monitors a file on the subscriber identity module entity 200 (the file being created for that purpose). Once the software client application 22 and/or the subscriber identity module applet 220 selects and modifies that file, the file update event is triggered.

According to exemplary embodiments of the present invention, it is furthermore provided to execute a subscriber identity module-related command (i.e. an application protocol data unit) only after the user action has been successfully performed (using the subscriber identity module toolkit 210 and/or the subscriber identity module toolkit implementation 21). In order to realize this, the application protocol data unit is temporarily stored (or cached) by the subscriber identity module applet 220. Thereafter, the subscriber identity module toolkit 210 is triggered, using, e.g., the file update event as described above, and the user action performed. Only after having successfully performed the user action, the temporarily stored (or cached) application protocol data unit (or subscriber identity module-related command) is being executed, and the result of the action is transmitted to the software client application 22.

Via the present invention, it is advantageously possible to realize a comparatively secure password store within the subscriber identity module entity 200: The passwords (or the specific information or the secret information) are stored within the subscriber identity module applet 220, and providing these passwords (or the specific information or the secret information) to the software client application is secured, through the required user action, by the subscriber identity module toolkit 210.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for authentication using a subscriber identity module (SIM) entity of a client computing device, wherein the method comprises:
   generating, on the SIM entity, a detection file stored on the SIM entity;
   providing, via the detection file, a software client application of the client computing device with indirect access to a SIM toolkit of the SIM entity, wherein the SIM toolkit comprises commands for execution by the client computing device, wherein the SIM toolkit is not directly accessible to the software client application of the client computing device, and wherein providing the indirect access via the detection file comprises:
      monitoring, by the SIM toolkit of the SIM entity, the detection file stored on the SIM entity;
      communicating, by the software client application, with a SIM applet of the SIM entity;
      based on the communications between the software client application and the SIM applet, modifying, by the software client application and/or the SIM applet, the detection file stored on the SIM entity; and
      based on monitoring the detection file stored on the SIM entity and detecting the modification of the detection file stored on the SIM entity, invoking a command of the SIM toolkit for execution by the client computing device; and
   based on the invoked command, requesting, by the client computing device, an authentication-related user action from a user of the client computing device.

2. The method according to claim 1, wherein requesting the authentication-related user action from the user of the client computing device comprises:
   displaying a message on a display of the client computing device;
   actuating a haptic actuator or a vibration actuator of the client computing device; and/or
   actuating an acoustic actuator of the client computing device.

3. The method according to claim 1, wherein after successful authentication based on the authentication-related user action, the method further comprises:
   requesting specific information.

4. The method according to claim 3, wherein the specific information corresponds to secret information stored within the SIM entity; and
   wherein the method further comprises: transmitting the secret information to the software client application in response to requesting the specific information.

5. A system for authentication using a subscriber identity module (SIM) entity of a client computing device, wherein the system comprises:
   the client computing device, wherein the client computing device is configured to execute a software client application; and
   the SIM entity, wherein the SIM entity comprises a SIM applet and a SIM toolkit, wherein the SIM toolkit comprises commands for execution by the client computing device, and wherein the SIM toolkit is not directly accessible to the software client application;
   wherein the SIM entity is configured to generate a detection file for providing the software client application with indirect access to the SIM toolkit via the detection file, wherein the detection file is stored on the SIM entity;
   wherein the SIM toolkit of the SIM entity is configured to monitor the detection file stored on the SIM entity;
   wherein the software client application of the client computing device and the SIM applet of the SIM entity are configured to communicate to modify the detection file stored on the SIM entity;
   wherein a command of the SIM toolkit of the SIM entity is configured to be invoked based on the SIM toolkit monitoring the detection file stored on the SIM entity and detecting the modification of the detection file stored on the SIM entity; and
   wherein the client computing device is configured to request, based on the invoked command, an authentication-related user action from a user of the client computing device.

6. The system according to claim 5, wherein requesting the authentication-related user action from the user of the client computing device comprises:
   displaying a message on a display of the client computing device;
   actuating a haptic actuator or a vibration actuator of the client computing device; and/or
   actuating an acoustic actuator of the client computing device.

7. One or more non-transitory computer-readable mediums having processor-executable instructions stored thereon for authentication using a SIM entity of a client computing device, wherein the processor-executable instructions, when executed, facilitate:
   generating, on the SIM entity, a detection file stored on the SIM entity;
   providing, via the detection file, a software client application of the client computing device with indirect access to a SIM toolkit of the SIM entity, wherein the SIM toolkit comprises commands for execution by the client computing device, wherein the SIM toolkit is not directly accessible to the software client application of the client computing device, and wherein providing the indirect access via the detection file comprises:
      monitoring, by the SIM toolkit of the SIM entity, the detection file stored on the SIM entity;
      communicating, by the software client application, with a SIM applet of the SIM entity;
      based on the communications between the software client application and the SIM applet, modifying, by the software client application and/or the SIM applet, the detection file stored on the SIM entity; and
      based on monitoring the detection file stored on the SIM entity and detecting the modification of the detection file stored on the SIM entity, invoking a command of a SIM toolkit for execution by the client computing device; and
   based on the invoked command, requesting, by the client computing device, an authentication-related user action from a user of the client computing device.

* * * * *